(Model.)
W. N. TALLEY.
MINING AUGER.
No. 269,739. Patented Dec. 26, 1882.
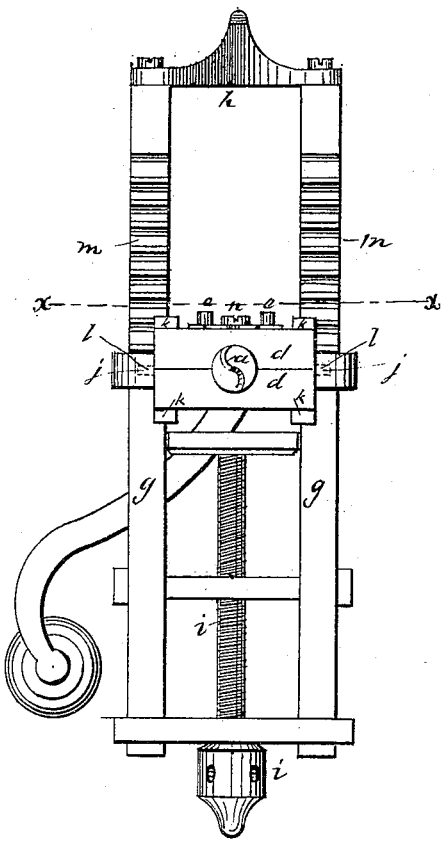
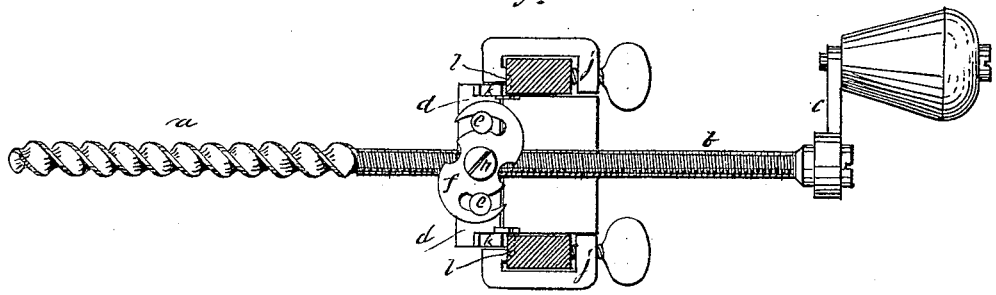
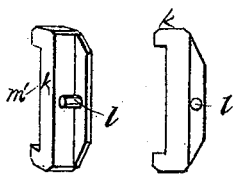
WITNESSES:
Chas. T. Howell,
C. Sedgwick
INVENTOR:
W. N. Talley
BY Munn & Co.
ATTORNEYS.

UNITED STATES PATENT OFFICE.

WILLIAM N. TALLEY, OF HAMPTON, WEST VIRGINIA.

MINING-AUGER.

SPECIFICATION forming part of Letters Patent No. 269,739, dated December 26, 1882.

Application filed July 3, 1882. (Model.)

*To all whom it may concern:*

Be it known that I, WILLIAM N. TALLEY, of Hampton, in the county of Kanawha and State of West Virginia, have invented a new and Improved Mining-Auger, of which the following is a full, clear, and exact description.

The object of the invention is to facilitate the removal and replacement of the auger screw and nut, as hereinafter described.

Reference is to be had to the accompanying drawings, forming part of this specification, in which similar letters of reference indicate corresponding parts in all the figures.

Figure 1 is a front elevation of my improved mining-auger and the apparatus for supporting it in the working position. Fig. 2 is a horizontal section of Fig. 1 on line $x\ x$. Fig. 3 shows detail views of the device for connecting the auger-nut to the supporting-frame.

The auger $a$, screw-threaded shank $b$, and the crank $c$ may be of the ordinary construction for boring into the solid coal, slate, and other like deposits by turning the auger in a screw-threaded supporting-nut, $d$. I make this nut in two parts, so that it can be readily taken apart to reset the auger for beginning a new bore, connecting the parts by the stud-pins $e$, having nicks in the side for the slotted S-shaped button $f$, attached to one of the parts of the nut by pivot-screw $n$, through which part the studs extend into the other part, in which they are permanently fixed, so that when the button $f$ is disengaged from the stud-pins said part having the button will slip off from said studs, or drop sufficiently on them to separate enough to allow the auger to draw out.

The nut $d$, for holding the auger, is mounted on the uprights $g$ of a strong frame, having a pointed head-piece, $h$, to be set up against the roof, and the lower end having a jack-screw, $i$, to rest in a bowl-shaped cavity on the floor, and to screw up against the roof of the mine to secure the frame in position. The nut $d$ is held in position on the upright of the frame by the clamps $j$, said clamps holding the clips $k$ by pressing their pivots or trunnions $l$ firmly in the notches $m$ of the sides of the uprights. The clips have recesses $m'$, in which the nut is readily placed by a slight movement of it from the direction of the wall to be bored, and so that when placed in position and the auger presses against the wall the nut is firmly secured, but so that it can be taken out in the most ready manner by turning the auger back a few turns and then shoving the auger and nut toward the wall, after which, by turning the nut upright, so that it will pass between the bars $g$ of the frame, the auger can be withdrawn from the bore to remove the borings, and be as readily replaced, which will greatly facilitate the work, because the auger must frequently be removed to clear out the hole.

Having thus fully described my invention, I claim as new and desire to secure by Letters Patent—

1. The combination, with a screw carrying an auger at one end and a crank at the other, of a nut, $d$, made in two parts, having nicked stud-pins $e\ e$, a button, $f$, with diagonally-opposite arc-slots, and a pivot-screw, $n$, whereby the parts of the nut may be conveniently operated without detachment to admit of taking out the auger-screw, as described.

2. The combination, with a frame, $g$, having notches $m$, of an auger-screw, $b$, nut having trimmed and recessed clips $k\ k$, and the clamps $j\ j$, whereby the nut may be withdrawn and replaced, as described.

WILLIAM N. TALLEY.

Witnesses:
HENRY PRESTON TOMPKINS,
JOHN G. W. TOMPKINS.